May 30, 1939.  W. F. KELLEY  2,160,153
CLUTCH FOR STATISTICAL MACHINES
Original Filed July 3, 1937  2 Sheets-Sheet 1
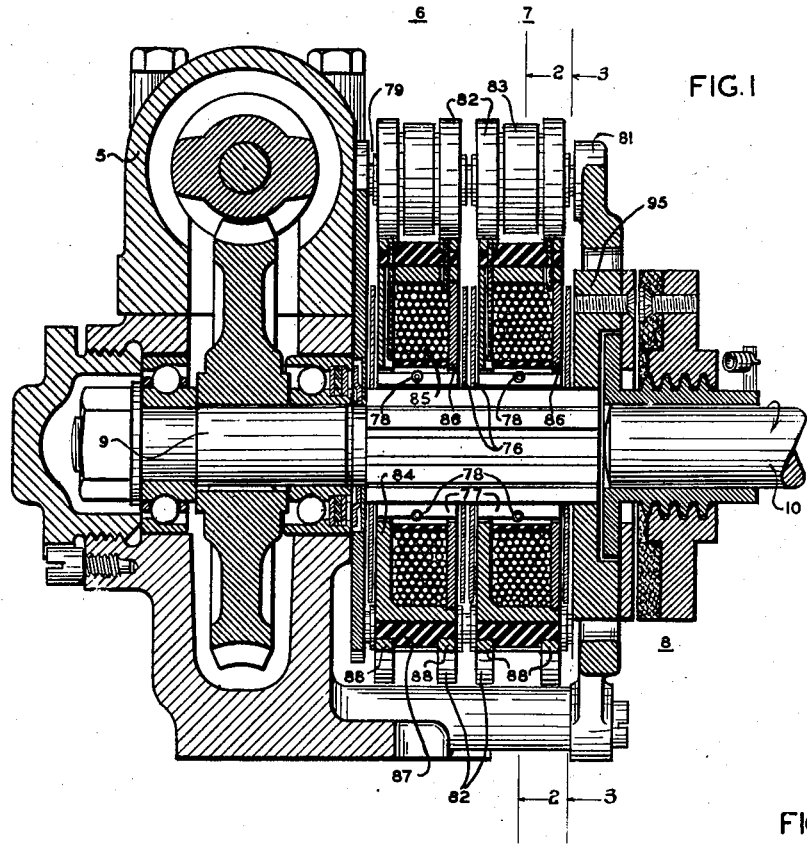
FIG.1
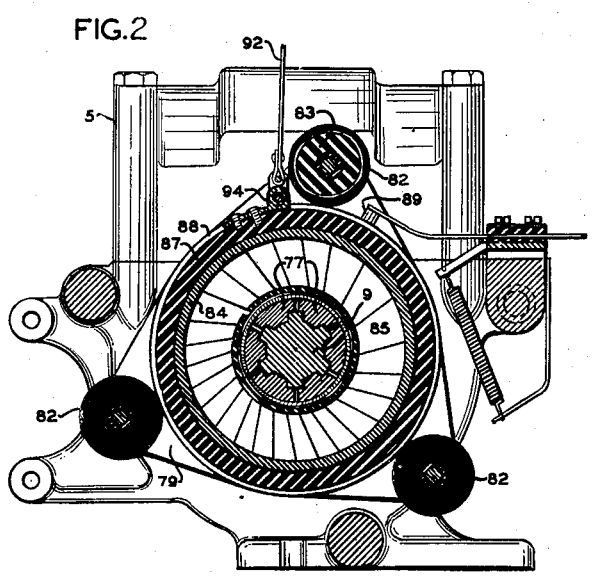
FIG.2
FIG.3
INVENTOR
WALTER F. KELLEY
BY W. A. Sparks
ATTORNEY May 30, 1939.  W. F. KELLEY  2,160,153
CLUTCH FOR STATISTICAL MACHINES
Original Filed July 3, 1937  2 Sheets-Sheet 2

INVENTOR
WALTER F. KELLEY
BY W. A. Sparks
ATTORNEY

Patented May 30, 1939

2,160,153

UNITED STATES PATENT OFFICE 2,160,153

CLUTCH FOR STATISTICAL MACHINES

Walter F. Kelley, Whitestone, N. Y., assignor to Remington Rand Inc., Buffalo, N. Y., a corporation of Delaware Original application July 3, 1937, Serial No. 151,870. Divided and this application January 13, 1938, Serial No. 184,717

7 Claims. (Cl. 192—84)

This invention relates to clutch mechanisms and more particularly to matter divided from my copending application S. N. 151,870, filed July 3, 1937 for Card punching mechanism.

The invention herein described relates more particularly to clutch mechanisms especially adapted for statistical card punching machines and similar devices wherein it is necessary to have a clutch which will perform a single rotation or definite part thereof and stop the actuated mechanism at the same point at each operation.

Clutch mechanisms of somewhat similar functional character have been used in statistical machines before and have been described in Patent 1,810,317 issued June 16, 1931, to W. W. Lasker and in Patent No. 2,124,178, issued July 19, 1938 also to Lasker. The present invention is an improvement over the previous designs in that it is simpler in its operation, more efficient, and is more easily lubricated.

The fundamental feature of the invention, hereinafter to be described in detail, consists in the electromagnetic positioning of a set of armature members which during disengagement are resiliently held in slots on the central clutch shaft. When the clutch is engaged, these armature members are caused to press outwardly against an annular surface and by means of such frictional engagement, cause the two component parts of the clutch to rotate together.

The object of the invention is to provide a simple and efficient clutch adaptable to all types of statistical machines.

Another object is to provide a clutch which may be operated electromagnetically with the expenditure of a small amount of electric power and which permits of a quick positive release, obviating any drag.

Still another object of the invention is to provide a clutch which will require a minimum of lubrication with no flat open slots or clearance spaces through which oil may escape.

The inventive features for the accomplishment of these and other objects are embodied in a power member and a drivable member suitably mounted and a plurality of armature members mounted upon the shaft of one of said members with an electromagnet so positioned and so adapted that, when energized, the armature members will operatively engage both members and cause them to rotate together.

Other objects and structural details of the invention will be apparent from the following description when read in connection with the accompanying drawings wherein:

Fig. 1 is a sectional view of the clutch embodying the invention;

Fig. 2 is a sectional view of the clutch taken on a line 2—2 of Fig. 1;

Fig. 3 is a fragmentary sectional view taken on a line 3—3 of Fig. 1;

Figure 5:
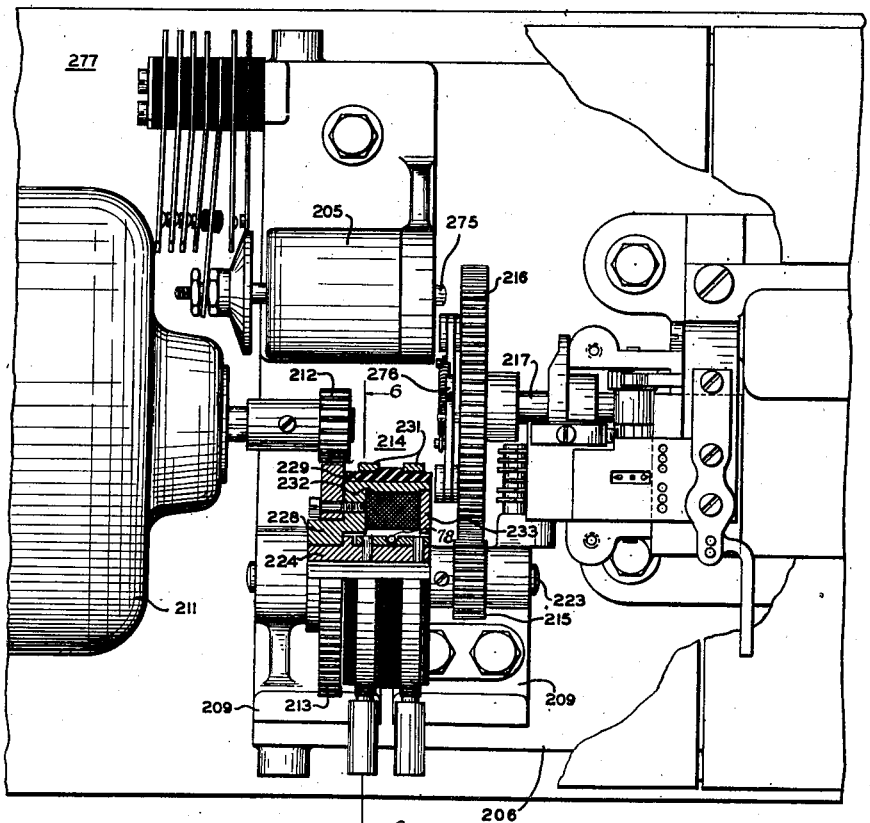
Fig. 5 is a fragmentary plan view of the clutch shown in Fig. 4, with parts of the clutch in section.

Referring now to the drawings in detail, Fig. 1 illustrates one method of mounting the clutches for use in statistical machines. Driven from speed reduction mechanism 5 and mounted upon short shaft 9, are three clutches 6, 7, and 8; clutches 6 and 7 being adapted to control a movable carriage in the machine and clutch 8 for controlling the main drive shaft 10, the axis of which is directly in line with that of shaft 9, and upon which there are mounted the several driving members for operations necessary in this type of machine.

PUNCH CLUTCHES

Clutches 6 and 7 are of the type claimed in this invention. Clutch 8 varies considerably in type of construction and has been described in detail in Patent No. 1,810,317 to William W. Lasker, June 16, 1931. In the Patent No. 2,124,178 of Lasker, a type of clutch is described which performs the same functions as the clutches 6 and 7 but differs from them in many mechanical and electrical features. The present disclosure shows a more improved type. As shown in Fig. 1, a short shaft 9 is supported at one end by bearings in the housing of speed reduction mechanism 5. The other end of shaft 9, as may be seen in Fig. 2, is splined, to engage armature blocks 77 which are resiliently held in engagement with said splines by springs 78 (Fig. 1) which are positioned by grooves in armature blocks 77. Mounted to one side of the speed reduction housing is a mounting frame 79, and also mounted in spaced relation to said housing is a mounting frame member 81. Mounted concentrically to the axis of shaft 9 and between mounting frames 79 and 81 are hard, grooved rollers 82 of insulating material.

As may be seen in Fig. 1, back space clutch 6 and carriage return clutch 7 are identical in construction and operation. The electromagnetic units of these two clutches are rotatably supported by rollers 82 and include an iron cup member 84 having a hole through its base in which is mounted a form wound coil 85. Fitted into the open end of cup member 84 to retain coil 85 therein, is an iron disc 86 which has a hole, through its center, the same diameter as the hole through cup member 84. Tightly fitted around cup member 84 is a ring 87 of insulating material around the edges of which are mounted a pair of spaced collector rings 88. The leads of coil 85 extend through holes in the rim of cup 84, ring 87 and one each through relative rings 88 to which they are electrically connected. Riding upon each of the rings 88 is one of a pair of resiliently held wipe contacts 89 (Fig. 2) through which the clutches 6 and 7 may be actuated.

Referring to Fig. 2 it will be seen that commutator rings 88 further serve as circular tracks and engage rollers 82 which maintain the electromagnetic units in concentric alignment with shaft 9. Lateral alignment on shaft 9 is maintained through the use of spacers 76 as shown in Fig. 1.

The holes in members 84 and 86 are of such size as to provide an air-gap 91 between them and the assembly of armatures 77 (Fig. 3).

It will be seen from the above clutch description in conjunction with Fig. 1 that cup member 84, retaining disc 86, and coil 85, together, form a horse-shoe type magnet which is adapted, when energized, to attract armature members 77 to the periphery of the holes in members 84 and 86, thereby causing the clutch to become effective and rotate the members with shaft 9 which is constantly driven through speed reduction mechanism 5. Mechanical power is derived from each clutch by a link 92 which is attached by a hinge member 94 to the insulating ring 87.

As may be seen in Fig. 2 a resilient rubber ring 83 is provided on the upper roll 82 of carriage return clutch 7, to act as a bumper for hinge member 94 to check the recoil of clutch member 87.

The drive clutch 7, functionally, is exactly similar and physically only slightly different from the one disclosed in the above cited application, Patent No. 2,124,178. The physical differentiation is well illustrated in Fig. 1 of the present drawings where it may be seen that the drive shaft 16 of the above cited application has been replaced by two shafts 9 and 10, and that shaft 9 now carries driving member 95 upon its splined end.

Figure 4:
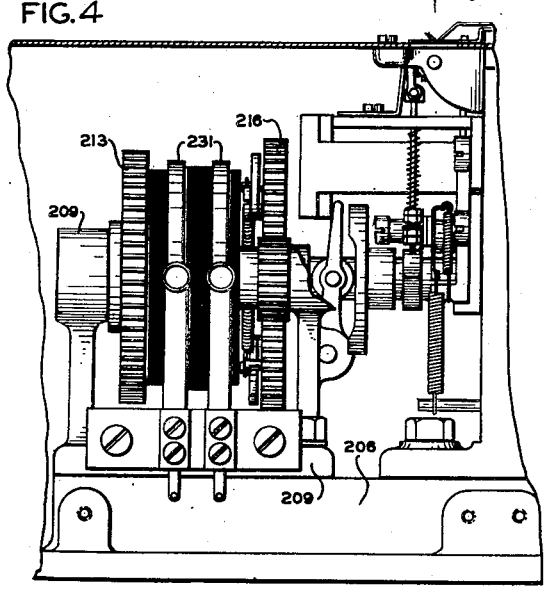
Fig. 4 is a front elevation of an alternate form of the invention and illustrates the clutch in combination with a punched tape sensing machine.
Figure 6:
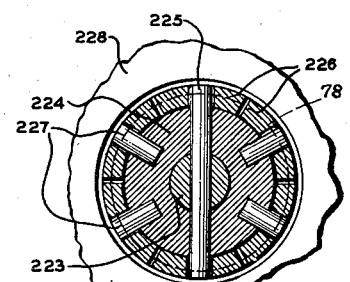
Fig. 6 is a fragmentary sectional view of the clutch shown in Figs. 4 and 5 taken along line 6—6 of Fig. 5.

TRANSLATOR CLUTCH (Figs. 4, 5, and 6)

The punch clutches described above, derive their power from a central rotating shaft and deliver their actuating energy to a carriage through the medium of a flexible ribbon attached to the clutch periphery. An alternate form of this invention is hereinafter described as used with a code translating device. This clutch 214 operates on the same general principles as the punch clutch but receives its driving power on its periphery and delivers the actuating impulse to a central shaft.

Journalled between brackets 209 which are mounted on a base 206 is a short shaft 223 upon which are mounted gear 215 and shouldered sleeve 224. Sleeve 224 is fixed to shaft 223 by a pair of pins 225, both ends of which extend beyond the periphery thereof (Fig. 6) and serve as guiding supports for a pair of armature members 226. Additional armature members 226 are positioned by pairs of stud pins 227 which are circumferentially aligned with pins 225. The armature members are resiliently held on shaft 224 by an encircling helical spring 78 which is positioned in a groove in the armature blocks 226. Journalled upon one end of sleeve 224 and its shoulder portion is a cup member 228 made of iron or any suitable magnetic material which is further positioned by one of the brackets 209 and has secured thereto gear 213. Surrounding cup member 228 is an insulated ring 229 which, in turn, is surrounded by a pair of spaced collector rings 231, which are respectively connected to the free ends of form wound coil 232 which is positioned in cup member 228 and held therein by retainer ring 233, which may be made of any suitable magnetic material. Cup member 228, retainer ring 233, and coil 232, together, form a circular horse-shoe type magnet which, when energized through collector rings 231, will draw armatures 226 into engagement with internal circumferential surfaces of members 228 and 233, and thereby through shaft 223, pins 225 and 226, gears 215 and 216, and shaft 217, cause the various driving cams and elements to be driven by motor 211 through its gear 212.

The operation of these clutches is controlled by a simple switching device or relay circuit in series with the source of power. The controlling circuit is connected to the spring brushes 89 and a current sent through the coil when it is desired to actuate the clutch and transmit power. Release is obtained by cutting off the power supply.

TRANSLATOR CLUTCH OPERATION (Figs. 4, 5, and 6)

This alternate form of the present invention is shown in conjunction with a mechanism which requires that the clutch members be engaged most of the time and disengagement be effected only to allow the main punching machine, which is controlled by the tape in this translator, time to complete certain functions which require longer duration than others to be completed. A complete description of the tape translator and the method of time control will be found included in my co-pending application S. N. 151,870 filed July 3, 1937 and hence all these details need not be described here.

When the punchings on the tape indicate an operation of long duration, a contact (not shown) is made, which causes current to flow through electromagnet 205, thereby causing a blocking pin 275 (Fig. 5) to be thrust into the path of resiliently held lugs 276 mounted on gear 216. Also when magnet 205 is energized, a group of contacts 277 will be shifted thereby making some circuits which are necessary for the operation to proceed and breaking other circuits, one of which is the clutch circuit. The breaking of the clutch circuit cuts off the energizing current from the clutch winding 232 and the armatures 226 fall back, due to their resilient support, into their respective splines and disengage the clutch. However, due to inertia and friction of the moving parts, the wheel 216 will continue to rotate until one of the latching lugs, 276 is engaged by the blocking pin 275 of magnet 205.

The gear 216 is held in locked position until the punch operation is completed, and upon such completion, another contact is broken which returns the pin 275 to its normal position, thus releasing the gear 216 and restoring the current in the clutch coil 232.

This action engages the armatures 226 with the annular surfaces 228 and 233 and causes the rotation of members 224 and 223, thus starting the tape feeding mechanism again.

While I have described what I consider to be highly desirable embodiments of my invention, it is obvious that many changes in form could be made without departing from the spirit of my invention and I, therefore, do not limit myself to the exact form herein described, nor to anything less than the whole of my invention as hereinbefore set forth, and as hereinafter claimed.

What I claim as new, and desire to secure by Letters Patent, is:

1. In a clutch of the class described, a framework, a splined power shaft supported in said framework, a plurality of rollers mounted upon said framework, a plurality of armature segments resiliently disposed about and adapted to be driven by said shaft, a ring-shaped electromagnet positioned by said plurality of rollers axially about said plurality of armature segments, and said electromagnet being adapted when energized, to engage said armature segments, thereby causing said power shaft to drive said electromagnet.

2. In a clutch of the class described, a power shaft, a plurality of armature segments disposed about and positively driven by said shaft, said segments being free to move radially from said shaft, a ring-shaped electromagnet independently mounted and surrounding said plurality of segments, said electromagnet when energized being adapted to attract said segments, thereby causing said electromagnet to be driven by said shaft.

3. In a clutch of the class described, a framework, a splined power shaft journalled in said framework, a plurality of rollers of insulating material mounted upon said framework and disposed about and equidistant from the axis of said shaft, a plurality of splined armature members adapted to be engaged and driven by said splined portion of said shaft, an annular spring adapted to resiliently retain said armature members in engagement with said power shaft, a sleeve of insulating material, a cup member of magnetic material fixed within said sleeve and having a hole through the center of its base of such diameter as to clear said resiliently held armature members, a magnet coil adapted to be positioned within said cup member and clear said armature members, a disc of magnetic material having an aperture coinciding with the hole in said cup member and being adapted to be fixedly mounted in the open end of said cup member to retain said coil therein, a pair of collector rings, each being electrically connected to one end of said coil and fixedly mounted around said sleeve and adapted to support said sleeve, cup, coil, and retaining disc for rotation between said rollers, a pair of resiliently held contacts adapted to engage the periphery of said collector rings, said sleeve, cup, coil, and retaining disc forming an electromagnet which, when energized through said contacts, is adapted to draw the outer surfaces of said armature members into engagement with the inner surfaces of said cup and said retaining disc thereby causing said power shaft to drive said electromagnetic unit which is adapted to transmit motion.

4. In a clutch of the class described, a shaft, a sleeve fixed to said shaft by a plurality of radial pins, a plurality of armature members disposed about said sleeve resiliently retained thereon and radially slidable upon said pins, a power driven ring-shaped electromagnet rotatably mounted upon said sleeve, and adapted when energized to attract said armature members thereby causing said shaft and its associated mechanism to be rotated by said power driven electromagnet.

5. In a clutch of the class described, a framework, a power shaft journaled in said framework, projections on said power shaft, a plurality of armature members adapted to be engaged by said projections, an annular spring adapted to resiliently retain said armature members in engagement with said power shaft, a cup of magnetic material concentrically mounted with said shaft and having a hole through the center of its base of such diameter as to clear said resiliently held armature members, a magnet coil adapted to be positioned within said cup member and clear said armature members, a disc of magnetic material having an aperture coinciding with the hole in said cup member and mounted in the open end of said cup member to retain said coil therein forming an electromagnet, which when energized, is adapted to draw the outer surfaces of said armature members into engagement with the inner surfaces of said cup and said retaining disc, thereby causing said power shaft to drive said electromagnetic unit which is adapted to transmit motion.

6. In a clutch of the class described, a rotary driving member, a rotary driven member, a plurality of armature segments disposed about and positively connected to one of said members but free to move radially thereon, a ring-shaped electromagnet on the other of said members and surrounding said plurality of segments, said electromagnets when energized being adapted to attract said segments, thereby coupling the two said members to rotate in unison.

7. In a clutch of the class described, a rotatable shaft, projections on said shaft, a plurality of armature members adapted to be engaged by said projections, an annular spring adapted to resiliently retain said armature members in engagement with said shaft, a cup of magnetic material concentrically mounted with said shaft and having a hole through the center of its base of such diameter as to clear said resiliently held armature members, a magnet coil within said cup member, a disc of magnetic material having an aperture in alignment with the hole in said cup member and mounted in the open end of said cup member to retain said coil therein forming an electromagnet, which when energized, is adapted to draw the outer surfaces of said armature members into engagement with said electromagnet, thereby causing said shaft and said electromagnet to rotate in unison.

WALTER F. KELLEY.